(12) United States Patent
  Bangalore

(10) Patent No.: US 7,913,003 B2
(45) Date of Patent: Mar. 22, 2011

(54) RECLAIM ALGORITHM FOR FAST EDITS IN A NONVOLATILE FILE SYSTEM

(75) Inventor: Kiran Kumar Bangalore, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1248 days.

(21) Appl. No.: 11/361,227

(22) Filed: Feb. 24, 2006

(65) Prior Publication Data

US 2007/0204126 A1    Aug. 30, 2007

(51) Int. Cl.
  *G06F 13/12* (2006.01)
  *G06F 13/38* (2006.01)
(52) U.S. Cl. .......................... 710/62; 711/165
(58) Field of Classification Search ............ 710/62; 711/170; 369/83
  See application file for complete search history.

(56) References Cited

U.S. PATENT DOCUMENTS

| | | | | |
|---|---|---|---|---|
| 4,334,287 A | * | 6/1982 | Wiedenman et al. | 710/36 |
| 4,905,185 A | * | 2/1990 | Sakai | 715/212 |
| 5,943,692 A | * | 8/1999 | Marberg et al. | 711/203 |
| 5,995,471 A | * | 11/1999 | Saoyama et al. | 369/47.13 |
| 6,081,495 A | * | 6/2000 | Saoyama et al. | 369/83 |
| 6,487,563 B1 | * | 11/2002 | Houldsworth | 707/206 |
| 2004/0205289 A1 | * | 10/2004 | Srinivasan | 711/103 |
| 2004/0205299 A1 | * | 10/2004 | Bearden | 711/137 |
| 2005/0071731 A1 | * | 3/2005 | Atri et al. | 714/763 |

* cited by examiner

*Primary Examiner* — Henry W Tsai
*Assistant Examiner* — Elias Mamo
(74) *Attorney, Agent, or Firm* — Kacvinsky Daisak PLLC

(57) ABSTRACT

A processing device stores fragmented files in a nonvolatile memory that are tracked in RAM as direct pointers. The initial file is stored in memory and data edits are stored in new memory locations and tracked as file offsets in the header structures associated with the memory blocks. The new reclaim/collapse algorithm collapses data into a reserved memory block using the edited file offsets.

14 Claims, 4 Drawing Sheets

RECLAIM ALGORITHM FOR FAST EDITS IN A NONVOLATILE FILE SYSTEM

With the continued increase in the power of computers, there is a growing interest in networks capable of delivering multi-media selections such as video and audio material. Technological developments permit digitization and compression of large amounts of voice, video, imaging, and data information which may be rapidly transmitted from computing equipment to other devices within a network. Thus, different digital technologies allow large amounts of data to transfer from one system to another.

Static data types such as images and video objects and streaming data types such as audio and video data require large volumes of storage space. The delivery of streaming data places constraints on the memory devices that are capable of meeting the strict deadline requirements of data objects. New memory performance improvements are needed.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
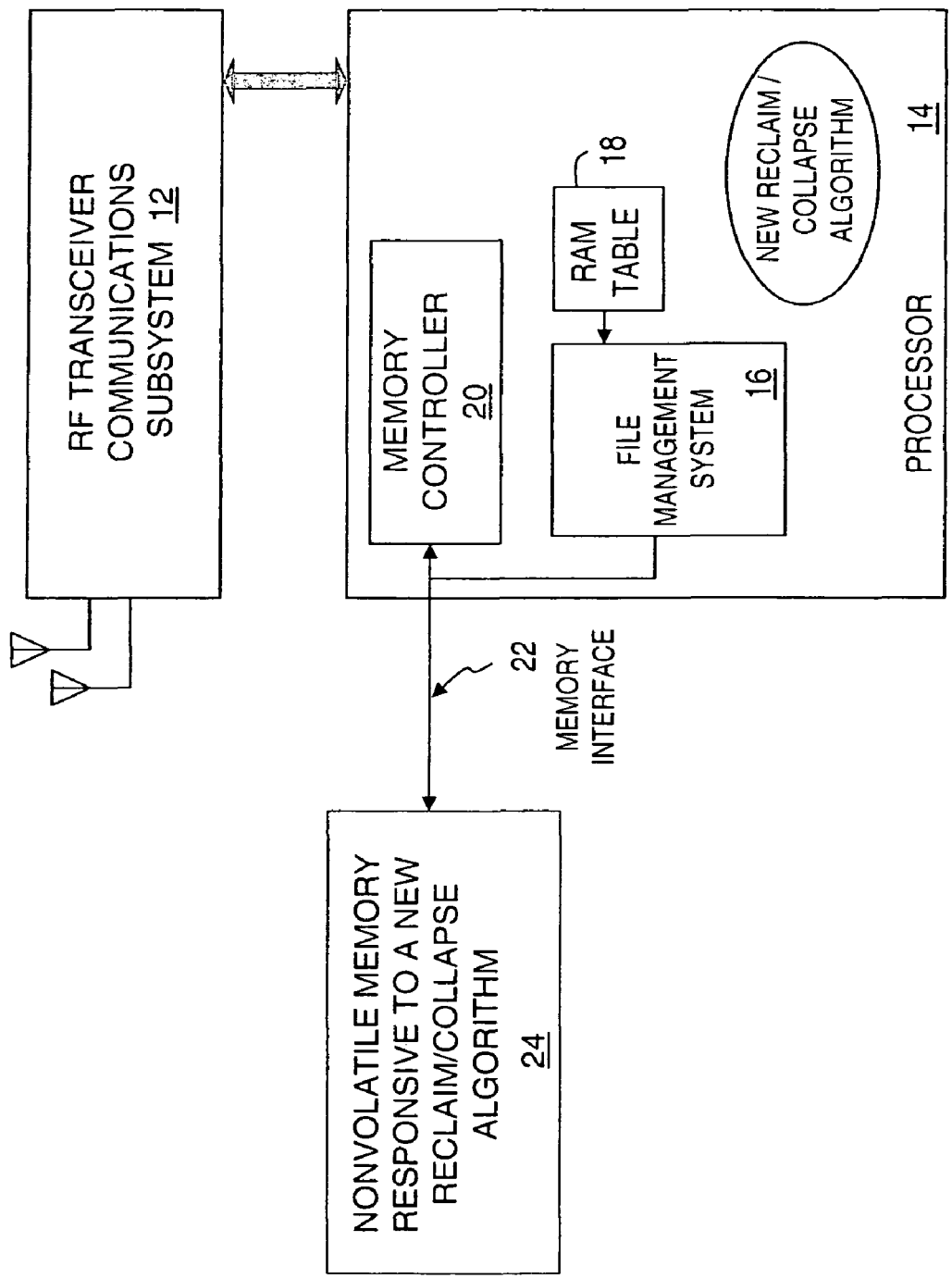
FIG. 1 is a diagram that illustrates a wireless device that incorporates circuitry to enable a wireless device to perform a new reclaim/collapse algorithm in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other while "coupled" may mean that two or more elements may or may not be in direct contact with each other, but yet still co-operate or interact with each other.

FIG. 1 is a block diagram illustrating a portion of a computing system that includes features of the present invention that may be incorporated, for example, into a processing device 10. In the embodiment shown, processing device 10 is a wireless communications device, but the present invention is not limited to wireless applications. In the wireless embodiment a transceiver 12 both receives and transmits a modulated signal from one or more antennas. The analog front end transceiver may be a stand-alone Radio Frequency (RF) integrated analog circuit, or alternatively, be embedded with a processor 14 as a mixed-mode integrated circuit. The received modulated signal may be frequency down-converted, filtered, then converted to a baseband, digital signal.

Processor 14 may be a stand alone processing device or a chipset that includes baseband and applications processing functions that utilize one or more processor cores. The processor core 14 may, in general, process functions that fetch instructions, generate decodes, find operands, and perform appropriate actions, then store results. A memory controller 20 controls a memory interface 22 that allows the processor core(s) and cache memory embedded within processor 14 to exchange data with an external system memory. Although not shown, processing device 10 may include other components such as, for example, additional processor cores, input/output (I/O) devices, periphery components, and system memory devices. However, for simplicity these additional components have not been shown. Further, the system memory may include a combination of memories such as a disc, a Random Access Memory (RAM), a Read Only Memory (ROM) and a nonvolatile memory 24, although neither the type nor variety of memories included in the system memory are limitations of the present invention.

Nonvolatile memory 24 may be a NAND memory device or a NOR memory device. Examples of nonvolatile memory 24 may include an ETOX™ Flash Memory, an Electrically Erasable and Programmable Read Only Memory (EEPROM), a Ferroelectric Random Access Memory (FRAM), a Polymer Ferroelectric Random Access Memory (PFRAM), a Magnetic Random Access Memory (MRAM), an Ovonics Unified Memory (OUM), or any other device capable of storing instructions and/or data and retaining that information even with processing device 10 in a power conservation mode. However, it should be understood that the scope of the present invention is not limited to these examples.

Although processor 14 and nonvolatile memory 24 are shown incorporated into a wireless device 10, the processor and nonvolatile memory may be included together in applications other than wireless applications as mentioned. Accordingly, embodiments of the present invention may be used in a variety of products, with the claimed subject matter incorporated into desktop computers, laptops, smart phones, MP3 players, cameras, communicators and Personal Digital Assistants (PDAs), medical or biotech equipment, automotive safety and protective equipment, automotive infotainment products, etc. However, it should be understood that the scope of the present invention is not limited to these examples.

Processor 14 includes a hierarchal file management system 16 and a Random Access Memory (RAM) table 18 that provide the capability of handling different size data blocks to improve utilization of the available storage space within nonvolatile memory 24. One example of software executed by processor 14 includes memory management software that may be used to manage the storage of code, data, and files in nonvolatile memory 24. The memory management software may be referred to in various embodiments as code management software, data management software, file management software, file system software, file system management software, flash file management software or a flash media manager.

In one embodiment the memory management software may be stored in nonvolatile memory 24 and may be fetched and executed from the nonvolatile memory without the intermediate step of loading the code to a volatile Random Access Memory (RAM). This may be referred to as Execute-In-Place (XIP) in some flash memories. In another embodiment the memory management software may be stored within processor 14.

File management system 16 combines a number of unique capabilities to provide storage solutions for embedded applications that include an enhanced reclaim/collapse algorithm to reduce the number of Power Loss Replacement (PLR) states and reduce memory fragment tracking.

Figure 2:
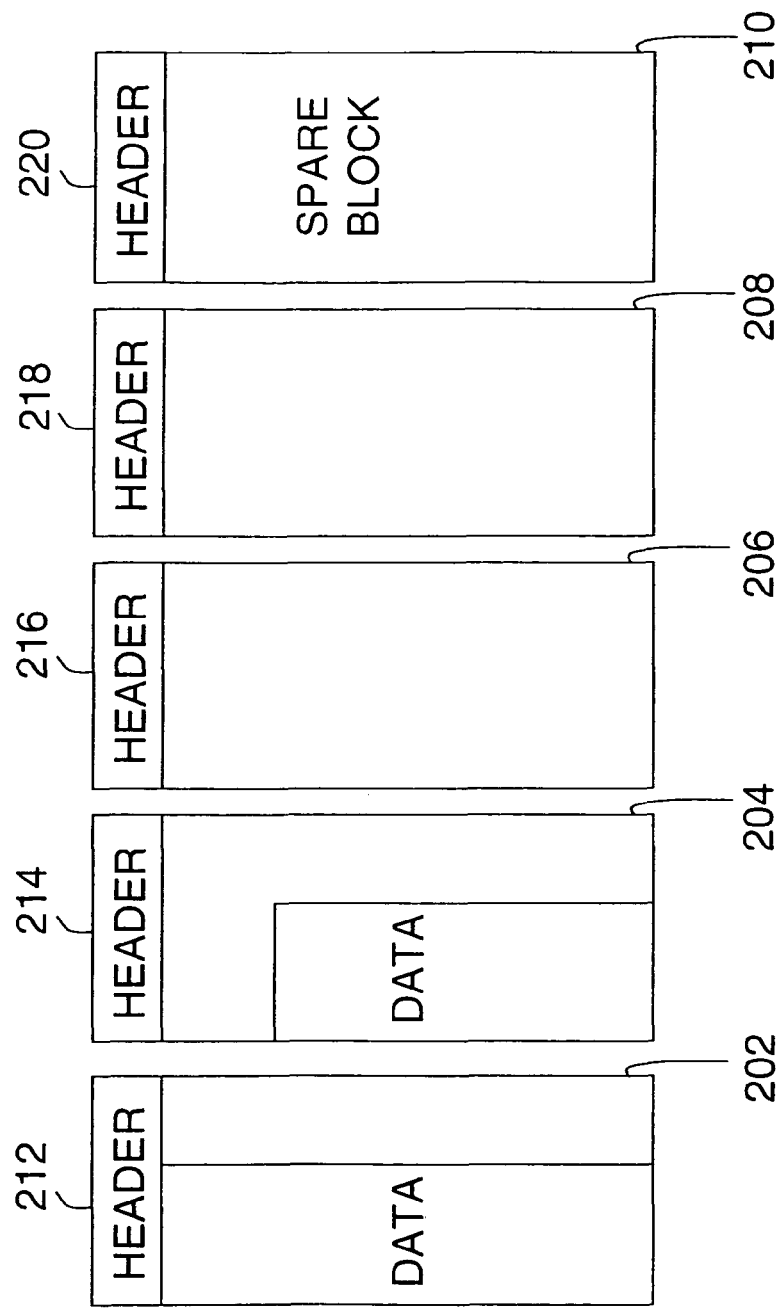
FIG. 2 is a diagram of a nonvolatile memory structured to store original files prior to performing the new reclaim/collapse algorithm.

FIG. 2 shows an embodiment of nonvolatile memory 24 that includes a memory array that is structured or arranged into one or more memory blocks. As illustrated in the figure, nonvolatile memory 24 includes five memory blocks denoted as blocks 202, 204, 206, 208 and 210, but note that the neither the number of blocks nor the size of the blocks is a limitation in the present invention. In other words, nonvolatile memory 24 may include an array having fewer than five blocks or more than five blocks. Further note that block 210 is labeled as "SPARE" and serves as a replacement block to store data following execution of the reclaim/collapse algorithm. Nonvolatile memory 24 may be arrayed with one or more "SPARE" blocks that are reserved for storing files in accordance with running the reclaim algorithm.

Each block in the array includes a plurality of nonvolatile memory cells such as, for example, flash memory cells capable of storing either one bit of information or multiple bits of information per memory cell. Access to the information stored in the memory blocks is provided through physical addresses generated by the memory management software executing on processor 14. Whereas nonvolatile memory 24 may only be erasable at a block level (a block-by-block basis), specific ranges of the physical addresses map the information stored at a byte level in the individual memory blocks.

Block headers 212, 214, 216, 218 and 220 correspond to the respective blocks 202, 204, 206, 208 and 210 and may be used to store information pertinent to the associated block. By way of example, block headers may include the size of a file stored within the associated block, a location for the corresponding file within the block (e.g., the byte offset in the block the points to the start of the file), an identifier to identify the file to which a corresponding file belongs and a position of the corresponding file relative to all other files. Note that some of the information stored in the block headers may be used to link or tie portions of files together.

Block headers 212, 214, 216, 218 and 220 may also include one or more status bits that indicate a status or state of a corresponding file. By way of example, the block header may contain one or more status bits that indicate if the writing of the entire file was interrupted by a loss of power. A Power Loss Recovery (PLR) algorithm or scheme identifies corrupt files or invalid files generated by the loss of power during the writing of a file to nonvolatile memory 24. The appropriate status or state bit(s) in the block header are properly set when the PLR algorithm detects a corrupt file.

A file written to nonvolatile memory 24 may be stored contiguously, or alternatively, the file may be divided or broken into one or more file fragments. In some embodiments the file manager software, upon receiving a request to store a file in nonvolatile memory 24, may divide or partition a file into one or more file fragments and store the fragments in one or more blocks of nonvolatile memory 24.

FIG. 2 shows data, instructions, files or code written into free space of a flash memory and simply marked as "DATA" in blocks 202 and 204. Block headers 212 and 214 indicate the storing of the file in blocks 202 and 204 and include updated information about the size, location, etc. of the file. Briefly referring to FIG. 1, RAM table 18 tracks the files written to nonvolatile memory 24 through links and offset values. RAM table 18 is created at start-up and the stored information is lost on power-down. RAM table 18 that contains all the locations of the links allows faster memory reads. RAM table 18 is populated at initialization and used to read/seek into the files.

Figure 3:
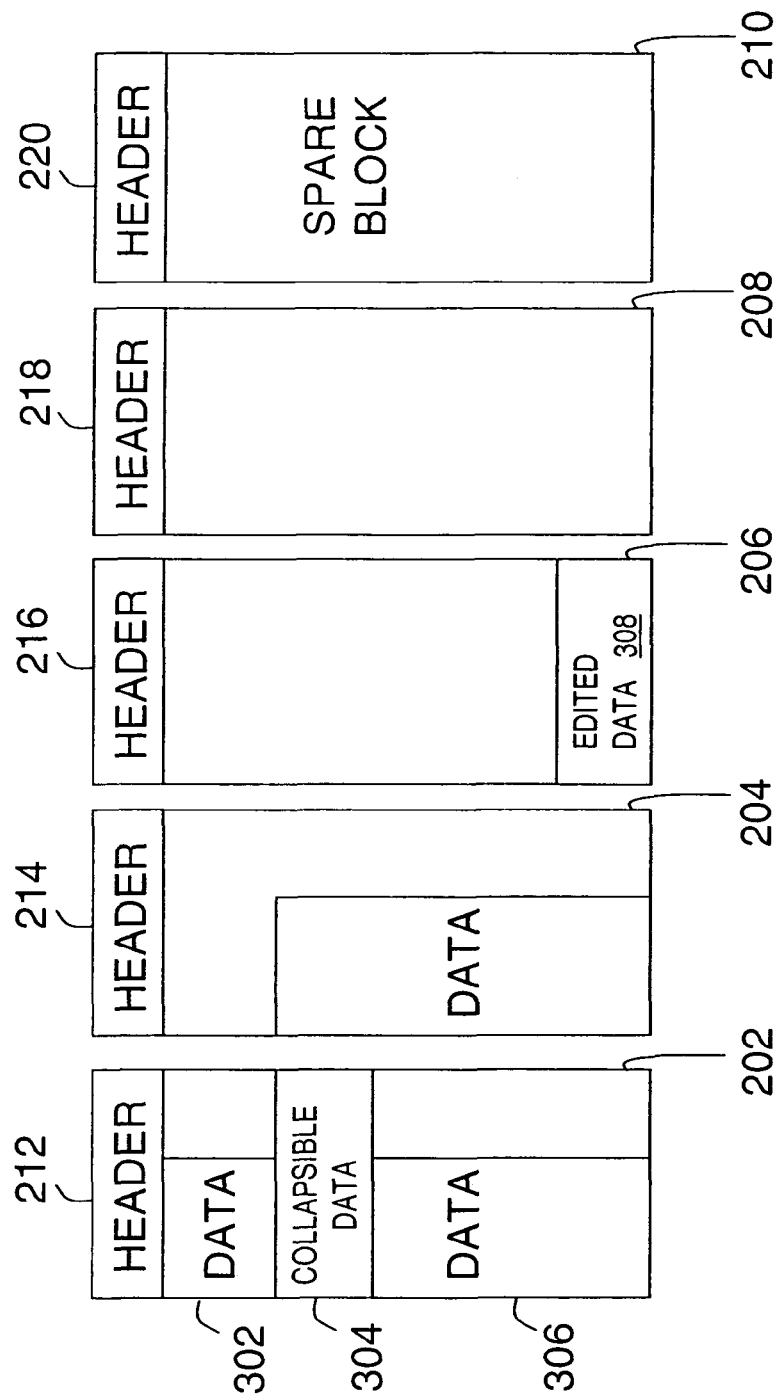
FIG. 3 is a diagram of a nonvolatile memory structured to store edited data prior to performing the new reclaim/collapse algorithm.

FIG. 3 illustrates a continuation in the example shown in FIG. 2 that stored a file in blocks 202 and 204. FIG. 3 further illustrates a modification or edit made to a portion of the existing file that was previously stored in block 202. The edited portion 304 of the existing file is labeled COLLAPSIBLE DATA in block 202 and the corresponding new data 308 to replace this edited portion is labeled EDITED DATA and stored in block 206. The unedited, original portions of the file are labeled DATA 302 and DATA 306. Again, briefly referring to FIG. 1, RAM table 18 tracks edits using edit numbers, with only the latest edits for that offset stored in the table. RAM table 18 stores known good data that may be used in reclaiming and performing other operations.

Figure 4:
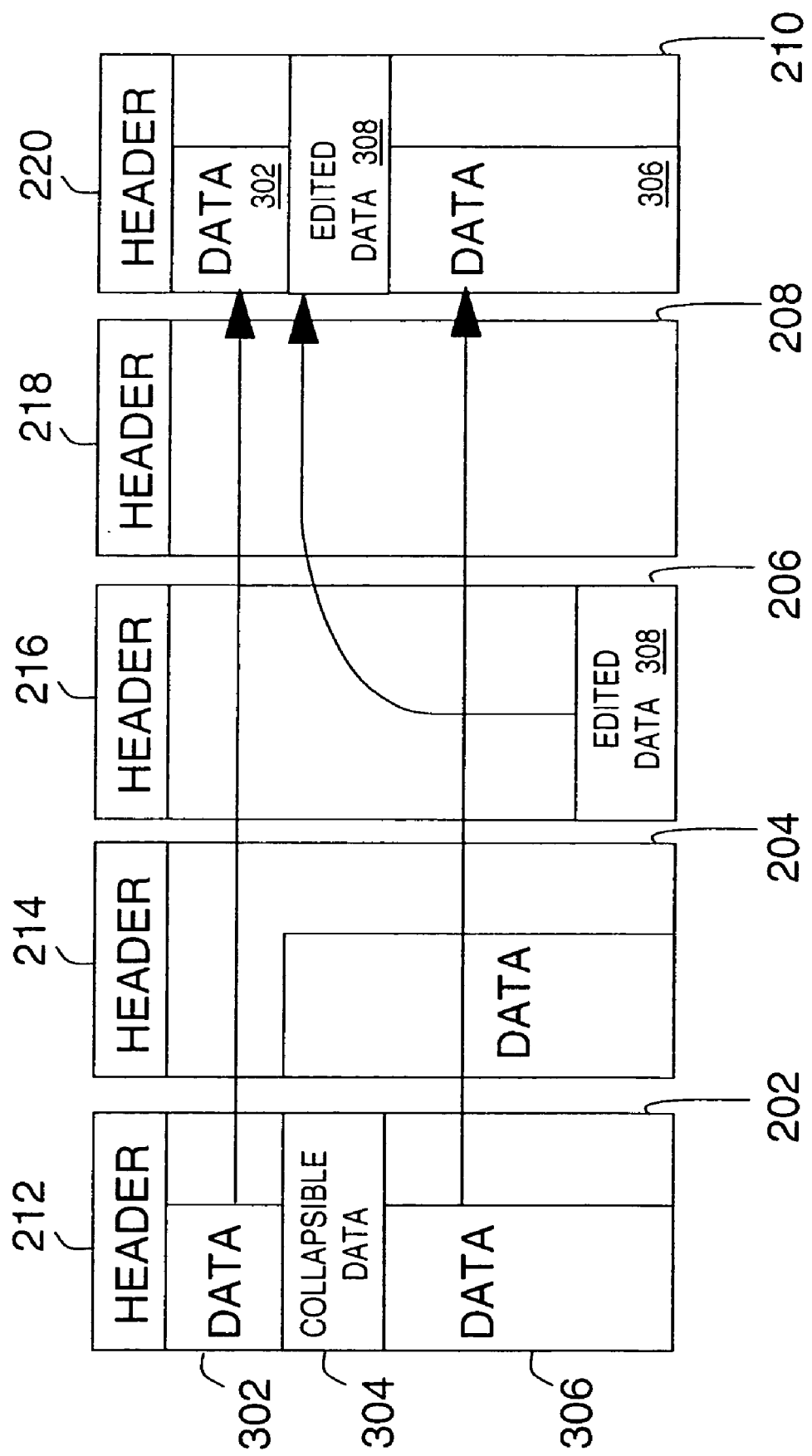
FIG. 4 is a diagram of a nonvolatile memory storing both original and edited file data following execution of the new reclaim/collapse algorithm.

FIG. 4 illustrates data stored in nonvolatile memory 24 in accordance with the present invention after execution of the reclaim/collapse algorithm. The reclaim/collapse algorithm may be run periodically or initiated at specific times under the control of the file management system 16. The reclaim/collapse algorithm should be run often enough to provide a clean memory system that benefits wireless device 10. RAM table 18 provides the pointers with links and offset values to write spare block 210 with data from the original file and the edited data portions. Thus, by running the reclaim/collapse algorithm the file and new edits may be stored as a contiguous file in spare block 210.

When the reclaim/collapse algorithm is initiated, RAM table 18 provides a pointer to processor 14 to write the portion of the file labeled DATA 302 as stored in block 202 to spare block 210. Upon completion of writing DATA 302 to spare block 210, RAM table 18 then provides the pointer to EDITED DATA 308 and spare block 210 is written with this edited data previously stored in block 206. RAM table 18 then provides the pointer to DATA 306 and spare block 210 is written with DATA 306 previously stored in block 202. Header 220 properly denotes the newly stored information pertaining to the contiguous file stored in spare block 210. Thus, spare block 210 is reserved to store both original file fragments and modified file fragments in a contiguous file or file fragment upon execution of the reclaim/collapse algorithm.

In normal operation the application executing in processor 14 writes many different areas of memory in the various memory blocks 202, 204, 206, 208 and 210. The many data blocks each include an associated block header. When the reclaim/collapse algorithm is through executing, memory space is freed and the number of block headers is reduced. Thus, with smaller memory spaces optimized into a larger memory space, the number of block headers is similarly reduced and the memory space allocated to block headers may be recovered. This reduction in used RAM space increases the amount of free space which makes edits easier and system reads/writes faster.

The reclaim/collapse algorithm is typically a slower operation. To improve the performance of processor 14 the reclaim/collapse algorithm includes operations that may be executed in a foreground mode and in the background mode, although this is not a requirement of the present invention. In the foreground mode, memory space is freed to allow new writes of data in blocks 202, 204, 206, 208 and 210. In the background mode, the memory spaces are optimized to provide larger memory spaces that optimize usage of RAM table 18. Thus, the reclaim/collapse algorithm may be used to enhance performance of an editable file system that supports fragmented file stores. As illustrated in FIGS. 2 and 3, one header per memory block may be utilized to store PLR information for all of the file fragments. By using one header per memory block, the amount of time to write a file to nonvolatile memory 24 is reduced since PLR information is not tracked for each file fragment but rather is tracked only at the file level.

Performance enhancements for wireless device 10 also result from the fewer number of file portions in the fragmented file system following execution of the reclaim/collapse algorithm. The fewer number of file portions expedite edits of the file system. Upon running the reclaim/collapse algorithm, empty data blocks within the file system are merged together forming larger blocks to reduce fragmentation of the storage system. Performance enhancements for wireless device 10 also result from RAM table 18 tracking fewer files in the tables (the dynamic link table) used to address the memory data.

By now it should be apparent that the present invention may allow processing devices that store files in fragmented file systems easier edits of the file system. The initial file is stored in memory and data edits are stored in new memory locations. The data edits are tracked as file offsets in the header structures and pointers are tracked in RAM as direct pointers. Memory areas are accounted for in the algorithm as three different kinds of regions; a free memory region (SPARE BLOCK 210, FIG. 3), a dirty memory region and collapsible memory regions (collapsible data 304, FIG. 3). The new reclaim/collapse algorithm collapses data back into the edited file offsets. Thus, the new reclaim/collapse algorithm allows memory areas around the edit regions in files to be useful.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A circuit, comprising:
a transceiver;
first and second antenna coupled to the transceiver to transmit over a channel a sequence of transmissions;
a processor coupled to the transceiver;
a nonvolatile memory coupled to the processor to store an original file in a first memory location and edited file data in a second memory location, wherein the processor executes a reclaim algorithm to assemble a contiguous file in a third memory location from the original file with the edited file data as replacement data to the original file;
a block header in the nonvolatile memory to store data to characterize the original file and the edited file and to indicate a state of a corresponding file using one or more status bits; and
a writeable table in volatile Random Access Memory (RAM) to provide pointers with links and offset values to write the third memory location with data from the first and second memory locations.

2. The circuit of claim 1 wherein the third memory location is reserved to store the contiguous file that is generated by the reclaim algorithm.

3. The circuit of claim 1 further including a writeable table in volatile Random Access Memory (RAM) to store pointers with links and offset values to track the original file and the edited file data stored in the nonvolatile memory.

4. The circuit of claim 1 wherein the reclaim algorithm is run in a background mode of the processor.

5. A system comprising:
a transceiver having a channel selector to select a channel;
a nonvolatile memory;
a processing device having a Random Access Memory (RAM) storage to provide pointers to locate an initial file stored in the nonvolatile memory and data edits to the initial file wherein a reclaim algorithm executed by the processing device collapses data into a reserved memory block,
wherein the nonvolatile memory includes a memory block having a header structure to store file offsets to locate the initial file and the data edits to the initial file and to indicate a state of a corresponding file using one or more status bits; and
a writeable table in volatile Random Access Memory (RAM) to provide pointers with links and offset values to write the third memory location with data from the first and second memory locations.

6. The system of claim 5 wherein the nonvolatile memory does not include a table to store the pointers to locate the initial file and the data edits to the initial file.

7. The system of claim 5 wherein execution of the reclaim algorithm by the processing device reduces a number of pointers stored in the RAM storage.

8. The system of claim 5 wherein the collapsed data stored in the reserved memory block is a contiguous file that includes the initial file overlaid with the data edits.

9. A wireless device comprising:
a nonvolatile memory arrayed in multiple memory blocks;
a processor to run a reclaim algorithm to collapse a file and an edited file stored in the nonvolatile memory and store the reclaim algorithm contiguous file result in a reserved memory block;
a block header in the nonvolatile memory to store data to characterize the file and the edited file data and to indicate a state of a corresponding file using one or more status bits; and
a writeable table in volatile Random Access Memory (RAM) to provide pointers with links and offset values to write the third memory location with data from the first and second memory locations.

10. The wireless device of claim 9 further including a table in the processor to store pointers with links and offset values to track the file and the edited file data stored in the nonvolatile memory.

11. The wireless device of claim 9 wherein the reclaim algorithm runs in a foreground mode or a background mode of the processor.

12. A wireless device, comprising:
a processor embedded with a nonvolatile memory to run a reclaim algorithm to collapse a file and an edited file data stored in the nonvolatile memory and store a resulting contiguous file in a memory block that is reserved for reclaim algorithm results;

a block header in the nonvolatile memory to store data to characterize the file and the edited file and to indicate a state of a corresponding file using one or more status bits; and a writeable table in volatile Random Access Memory (RAM) to provide pointers with links and offset values to write the third memory location with data from the first and second memory locations.

13. The method of claim 12 wherein a table in the processor stores pointers with links and offset values to track the file and the edited file data stored in the nonvolatile memory.

14. The method of claim 12 wherein the reclaim algorithm runs in background mode or a foreground mode of the processor.

* * * * *